United States Patent
Ciriello et al.

(12)

(10) Patent No.: US 12,472,041 B2
(45) Date of Patent: Nov. 18, 2025

(54) OPTICAL COHERENCE TOMOGRAPHY FOR INTRA-ORAL SCANNING

(71) Applicant: Perceptive Technologies, Inc., Boston, MA (US)

(72) Inventors: Christopher John Ciriello, Boston, MA (US); Phillip Getto, Wellesley, MA (US); Dean Addison, Victoria (CA); Brian King, Victoria (CA); Ryan Lucas Field, Toronto (CA)

(73) Assignee: Perceptive Technologies, Inc., Boston, MA (US)

( * ) Notice: Subject to any disclaimer, the term of this patent is extended or adjusted under 35 U.S.C. 154(b) by 161 days.

(21) Appl. No.: 18/470,030

(22) Filed: Sep. 19, 2023

(65) Prior Publication Data
US 2024/0261068 A1    Aug. 8, 2024

Related U.S. Application Data

(63) Continuation of application No. PCT/US2022/022550, filed on Mar. 30, 2022.

(60) Provisional application No. 63/227,865, filed on Jul. 30, 2021, provisional application No. 63/218,108, filed on Jul. 2, 2021, provisional application No.
(Continued)

(51) Int. Cl.
| | |
|---|---|
| A61C 9/00 | (2006.01) |
| A61B 1/24 | (2006.01) |
| A61B 34/30 | (2016.01) |
| A61C 1/00 | (2006.01) |
| A61C 1/08 | (2006.01) |
| G06T 7/00 | (2017.01) |

(Continued)

(52) U.S. Cl.
CPC ............... *A61C 9/0053* (2013.01); *A61B 1/24* (2013.01); *A61B 34/30* (2016.02); *A61C 1/0015* (2013.01); *A61C 1/082* (2013.01); *G06T 7/0012* (2013.01); *G06T 7/70* (2017.01); *G06T 11/00* (2013.01); *A61B 2034/302* (2016.02); *G06T 2207/10024* (2013.01); *G06T 2207/10101* (2013.01); *G06T 2207/30036* (2013.01); *G06T 2207/30244* (2013.01)

(58) Field of Classification Search
None
See application file for complete search history.

(56) References Cited

U.S. PATENT DOCUMENTS 5,343,391 A     8/1994   Mushabac
5,846,081 A *  12/1998   Bushway ............... A61C 1/082
                                                433/223
(Continued)

FOREIGN PATENT DOCUMENTS

DE      10145104 A1   1/2003
IN         07/2016    2/2016
(Continued)

OTHER PUBLICATIONS

Extended European Search Report for EP 22782093.3 dated Jan. 29, 2025.
(Continued)

*Primary Examiner* — Ryan Rink
(74) *Attorney, Agent, or Firm* — George Jakobsche Patent Counsel PLLC

(57) ABSTRACT

Provided are systems and methods for generating a three-dimensional model from an intra-oral optical coherence tomography scan.

20 Claims, 5 Drawing Sheets

Related U.S. Application Data

63/194,553, filed on May 28, 2021, provisional application No. 63/192,482, filed on May 24, 2021, provisional application No. 63/185,618, filed on May 7, 2021, provisional application No. 63/185,276, filed on May 6, 2021, provisional application No. 63/184,653, filed on May 5, 2021, provisional application No. 63/177,463, filed on Apr. 21, 2021, provisional application No. 63/167,868, filed on Mar. 30, 2021.

(51) Int. Cl.
*G06T 7/70* (2017.01)
*G06T 11/00* (2006.01)

(56) References Cited

U.S. PATENT DOCUMENTS

| | | | |
|---|---|---|---|
| 6,802,713 | B1 | 10/2004 | Chishti et al. |
| 6,845,190 | B1 | 1/2005 | Smithwick et al. |
| 8,251,984 | B2 | 8/2012 | Monty |
| 9,408,673 | B2 | 8/2016 | Monty |
| 9,622,833 | B2 | 4/2017 | Monty |
| 9,675,419 | B2 | 6/2017 | Akeel et al. |
| 9,788,915 | B2 | 10/2017 | Monty et al. |
| 10,016,242 | B2 | 7/2018 | Salcedo et al. |
| 11,382,727 | B1* | 7/2022 | Marghalani .......... A61C 9/0006 |
| 11,497,402 | B2 | 11/2022 | Fan et al. |
| 2003/0135092 | A1 | 7/2003 | Cline et al. |
| 2007/0115481 | A1 | 5/2007 | Toth et al. |
| 2007/0265495 | A1 | 11/2007 | Vayser |
| 2009/0154768 | A1 | 6/2009 | Bell |
| 2009/0186318 | A1 | 7/2009 | Assa et al. |
| 2011/0313825 | A1 | 12/2011 | Wilhelm et al. |
| 2012/0113280 | A1 | 5/2012 | Stupak et al. |
| 2013/0010079 | A1 | 1/2013 | Zhang et al. |
| 2013/0021447 | A1 | 1/2013 | Brisedoux et al. |
| 2013/0322719 | A1 | 12/2013 | Dekel et al. |
| 2015/0176775 | A1 | 6/2015 | Gu et al. |
| 2015/0320320 | A1 | 11/2015 | Kopelman et al. |
| 2015/0365604 | A1 | 12/2015 | Griffith et al. |
| 2016/0248994 | A1 | 8/2016 | Liu |
| 2016/0338803 | A1 | 11/2016 | Pesach |
| 2017/0319277 | A1 | 11/2017 | Cantor-Balan et al. |
| 2018/0085002 | A1 | 3/2018 | Glinec et al. |
| 2018/0185103 | A1* | 7/2018 | Mukumoto .......... A61C 9/0046 |
| 2019/0029524 | A1 | 1/2019 | Kopelman et al. |
| 2019/0038367 | A1* | 2/2019 | Ciriello .................. A61B 34/10 |
| 2019/0076026 | A1 | 3/2019 | Elbaz et al. |
| 2020/0000551 | A1 | 1/2020 | Li et al. |
| 2021/0191069 | A1* | 6/2021 | Karam .................... G02B 7/09 |
| 2022/0008159 | A1* | 1/2022 | Cho ........................ A61B 34/10 |
| 2022/0354623 | A1 | 11/2022 | Ciriello et al. |
| 2023/0200934 | A1 | 6/2023 | Ciriello et al. |

FOREIGN PATENT DOCUMENTS

| | | |
|---|---|---|
| WO | WO-2011014802 A2 | 2/2011 |
| WO | WO-2014024157 A1 | 2/2014 |
| WO | WO-2016022347 A1 | 2/2016 |
| WO | WO-2017130060 A1 | 8/2017 |
| WO | WO-2019005055 A1 | 1/2019 |
| WO | WO-2019215511 A2 | 11/2019 |
| WO | WO-2019215512 A1 | 11/2019 |
| WO | WO-2021044218 A1 | 3/2021 |
| WO | WO-2021155045 A1 | 8/2021 |
| WO | WO-2021257708 A1 | 12/2021 |
| WO | WO-2022051516 A1 | 3/2022 |
| WO | WO-2022060800 A1 | 3/2022 |
| WO | WO-2022212507 A1 | 10/2022 |

OTHER PUBLICATIONS

Fried et al.: Ablation of Dental Hard Tissues with a Microsecond Pulsed Carbon Dioxide Laser Operating at 9.3-μm with an Integrated Scanner. Proc SPIE Int Soc Opt Eng. 6843:16 pages (2008).

Fried et al.: Frailty in older adults: evidence for a phenotype. J Gerontol A Biol Sci Med Sci.; 56(3):M146-56 (2001).

Kauer et al.: Clinical evaluation of effects of low-level lasers on pain during cavity preparation. International Journal of Research—Granthaalayah. 6(10):81-86 (2018).

Kim et al.: Improved accuracy in periodontal pocket depth measurement using optical coherence tomography. J Periodontal Implant Sci. 47(1):13-19 (2017).

Le et al.: A non-invasive imaging and measurement using optical coherence tomography angiography for the assessment of gingiva: An in vivo study. J Biophotonics. 11(12) (2018).

Tsubokawa et al.: In vitro and clinical evaluation of optical coherence tomography for the detection of subgingival calculus and root cementum. J Oral Sci. 60(3):418-427 (2018).

URL https://en.wikipedia.org/wiki/Smoothness, printed Sep. 11, 2023, 9 pages.

U.S. Appl. No. 18/177,691 Office Action dated May 18, 2023.

Visuri et al.: Shear Strength of Composite Bonded to Er:YAG Laser-prepared Dentin. J Dent Res; 75(1):599-605 (1996).

Yuan et al.: An automatic tooth preparation technique: A preliminary study; Scientific Reports|6:25281 |DOI: 10.1038/srep25281, pp. 1-9 (2016).

* cited by examiner

OPTICAL COHERENCE TOMOGRAPHY FOR INTRA-ORAL SCANNING

CROSS-REFERENCE

This application is a continuation of International Application No. PCT/US2022/022550, filed Mar. 30, 2022, which claims the benefit of priority to U.S. Provisional Application No. 63/167,868, filed Mar. 30, 2021, U.S. Provisional Application No. 63/177,463, filed Apr. 21, 2021, U.S. Provisional Application No. 63/184,653, filed May 5, 2021, U.S. Provisional Application No. 63/185,276, filed May 6, 2021, U.S. Provisional Application No. 63/185,618, filed May 7, 2021, U.S. Provisional Application No. 63/192,482, filed May 24, 2021, U.S. Provisional Application No. 63/194,553, filed May 28, 2021, U.S. Provisional Application No. 63/218,108, filed Jul. 2, 2021, and U.S. Provisional Application No. 63/227,865, filed Jul. 30, 2021, which applications are incorporated herein by reference.

BACKGROUND

Optical coherence tomography (OCT) is an imaging modality commonly used for medical applications. Common embodiments currently use frequency swept or broadband light sources which emit light over a range of frequencies (wavelengths) depending on the type of tissue to be imaged. Reflections of light returning from within the tissue are used to create tomograms of the tissue microstructure.

Swept-source OCT imaging systems typically include a light source, an optical coupler or beam splitter, a reference arm, a beam scanning system, and a sensor. The OCT imaging system also may be coupled to a processor. A standard swept source OCT system is illustrated in FIG. 1. The source 100 emits light within the visible and/or infrared regions of the electromagnetic spectrum. At any instant of time, a laser with a narrow band of wavelengths is emitted from the light source. The source uses a spectral filter within the cavity to control the laser wavelength. The range of emitted wavelengths is dependent on a gain medium of the source. An exemplary swept source emits a laser with an instantaneous line width of 0.1 mm that is swept from 1250 to 1350 nm.

Light from the swept laser source is passed through an optical circulator that directs light into a 2×2 coupler. The coupler splits the light between a "reference" arm and a "sample" arm, which have nearly the same optical path length. The reference arm reflects the light back towards the 2×2 coupler. The sample arm contains elements to steer and focus the light onto a sample, which modulates the light and then reflects it back to the 2×2 coupler. The light from the two arms is recombined at the coupler, which generates optical interference in the combined light. The combined light is output from the 2×2 coupler in two arms which are sent to a balanced detector (one directly from the 2×2 coupler and one via the circulator). The balanced detector measures the difference between the measured optical signals from the two arms. The detector isolates the interference signal because of an 180° phase shift between the two input arms such that the DC signal is canceled out, while the interference signal is doubled. Data from the detector are taken for many different wavelengths within the scan range of the source, which are then processed by a computer to generate the final OCT signal used.

The sweep rate of the light source governs the image acquisition rate of the OCT system. Each sweep of the source corresponds to one column, that is, an axial scan, through the tissue. A slower lateral scan within the sample arm is used to collect multiple axial scans for a 2D image. The process continues similarly, sweeping out multiple lateral scans to form a 3D volumetric image.

A computer is often used to resample and Fourier transform each column of the data set. The volumetric image is represented by a 4-tuple (x, y, z, v) with x, y, z corresponding to spatial locations and v corresponding to the reflectivity of the tissue at the specified spatial location.

A greater sweep rate is required from the swept laser to image with greater speed. Sweeping a laser at a fast rate, however, often comes with negative consequences. When the sweep rate increases, the amount of reflected light collected is reduced, thus lowering the signal to noise ratio. The instantaneous line width of the source can be increased to provide more optical power, but this reduces the useful imaging range of the OCT instrument.

In the absence of mechanical stabilization, current state of the art sources are not fast enough to capture enough samples in a short enough time period and with enough power to prevent motion and noise artifacts from manifesting in collected 3D volumes, thus reducing the positional accuracy of structures within these volumes.

As an alternative to increasing the sweep rate, prior art OCT systems have reduced the number of A scans captured in a single image, which inherently reduces either the resolution or size of the captured volume. Thus, to maintain the same spatial lateral resolution, a larger number of individual volumetric image frames must be collected and stitched together to capture extended volumes of the dental anatomy. Increasing the number of individual images, increases the computation load required to stitch the individual images together to form a single composite image.

OCT imaging in dentistry suffers from the problems mentioned above, long frame imaging times and limited field of view generally requiring a multiplicity of frames to capture the anatomy of an entire single tooth, let alone to capture the full dentition of an entire arch. This disclosure describes an apparatus and method to overcome these problems using a stabilization and motion control system to enable the capture of a multiplicity of volumetric images (frames) with good positional accuracy and with known spatial relationships enabling fast, accurate and efficient stitching of the frames.

Additionally, OCT imaging in dentistry suffers from a limited penetration depth which is shallower than the tooth depth, therefore there is a need to image below the maximum OCT penetration depth. This disclosure describes a method to image below the maximum OCT penetration depth by taking OCT images during surgery after a section of tooth has been removed by a cutting system.

SUMMARY

Provided herein are embodiments of a method of overlaying color onto an image captured by an optical coherence tomography (OCT) system comprising: tracking a position of a first image sensor of an OCT system during capture of a first image of a target area by the first image sensor: tracking a position of a second image sensor during capture of a second image of the target area by the second image sensor, wherein the second image sensor is a color image sensor: finding the surface boundary in the OCT image: correlating positional data of the second image sensor with the first image sensor to align the OCT image captured by the first image sensor with a color image captured by the second image sensor; and superimposing the color image onto the surface boundary extracted from the OCT image.

In some embodiments, the capture of a first image of the target area comprises illuminating the target area with a light source, wherein illuminating the target area comprises sequentially illuminating the target area with a red light source, a green light source, and a blue light source. In some embodiments, each the red light source, the green light source, and the blue light source emit light in a structured pattern. In some embodiments, the red light source, the green light source, and the blue light source each comprise a narrow band light source. In some embodiments, the capture of a first image of the target area comprises illuminating the target area with a white light source, and wherein the method further comprises applying a red bandpass filter, a green bandpass filter, and a blue bandpass filter. In some embodiments, the red bandpass filter, the green bandpass filter, and the blue bandpass filter are applied sequentially. In some embodiments, the white light source emits a structured light pattern.

In some embodiments, the second image sensor comprises a video camera. In some embodiments, the first image sensor captures the first image of the target area and the second image sensor captures the second image of the target area simultaneously. In some embodiments, the first image sensor captures the first image of the target area and the second image sensor captures the second image of the target area sequentially.

In some embodiments, the method further comprises stabilizing the first image sensor prior to the capture of the first image. In some embodiments, stabilization is achieved via a mechanical stabilization system. In some embodiments, stabilization is achieved via electromechanical actuators. In some embodiments, the stabilization is achieved via feedback control. In some embodiments, the stabilization is achieved via feedforward control.

In some embodiments, the stabilization is achieved via a combination of feedback and feedforward control. In some embodiments, the stabilization is achieved through optical stabilization methods leveraging scanning laser confocal microscopic images, which then feedback to the scanner in OCT scanning mechanisms to actively correct the target motion on the fly. In some embodiments, the stabilization is achieved through a combination of passive and active means. In some embodiments, tracking the position of the first image sensor comprises tracking the first image sensor relative to a clamp secured onto at least one tooth. In some embodiments, the first image sensor is provided on an end effector of a robotic system.

In some embodiments, the robotic system comprises a controller and an encoder, wherein the controller and encoder track the position of the end effector. In some embodiments, the controller receives positional data of the clamp. In some embodiments, the positional data of the clamp is provided by a fiducial provided on the clamp and captured by the first image sensor. In some embodiments, the positional data of the clamp is provided by a fiducial provided on the clamp and captured by the second image sensor. In some embodiments, the controller automatically stabilizes the end effector relative to the clamp. In some embodiments, movement of the end effector is fully automated. In some embodiments, movement of the end effector is controlled by a user as the controller automatically stabilizes the end effector relative to the clamp. In some embodiments, tracking the position of the second image sensor comprises tracking the second image sensor relative to a clamp secured onto at least one tooth. In some embodiments, the first image sensor is provided on an end effector of a robotic system. In some embodiments, the robotic system comprises a controller and an encoder, wherein the controller and encoder track the position of the end effector. In some embodiments, the controller receives positional data of the clamp. In some embodiments, the positional data of the clamp is provided by a fiducial provided on the clamp and captured by the first image sensor. In some embodiments, the positional data of the clamp is provided by a fiducial provided on the clamp and captured by the second image sensor. In some embodiments, the controller automatically stabilizes the end effector relative to the clamp. In some embodiments, movement of the end effector is fully automated. In some embodiments, movement of the end effector is controlled by a user as the controller automatically stabilizes the end effector relative to the clamp.

In some embodiments, the method further comprises generating a three-dimensional surface area based on the surface boundary extracted from the OCT image. In some embodiments, the method further comprises highlighting areas of tooth decay.

Provided herein are embodiments of a method of performing an intraoral scan using optical coherence tomography to image dental anatomy, comprising: performing a volumetric scan using an OCT system supported by a mechanical stabilization system to capture at least two partially overlapping images of intraoral surfaces: identifying a change in an OCT signal intensity at the exterior surface of the tooth; and using a segmentation algorithm to generate a three-dimensional model of the tooth surfaces from the at least two partially overlapping images of the intraoral surfaces; and using a stitching algorithm to register the at least two partially overlapping images to each other.

In some embodiments, the at least two partially overlapping images are captured simultaneously. In some embodiments, the at least two partially overlapping images are captures sequentially. In some embodiments, the dental anatomy comprises a subgingival surface of a tooth. In some embodiments, the dental anatomy a surface of a tooth contacting a surface of an adjacent tooth.

In some embodiments, the method further comprises stabilizing the OCT system prior to the capture of a first image. In some embodiments, stabilization is achieved via electromechanical actuators. In some embodiments, stabilization is achieved via feedback control. In some embodiments, the stabilization is achieved via feedforward control. In some embodiments, the stabilization is achieved via a combination of feedback and feedforward control. In some embodiments, the stabilization is achieved through optical stabilization methods leveraging scanning laser confocal microscopic images, which then feedback to the scanner in OCT scanning mechanisms to actively correct the target motion on the fly. In some embodiments, the stabilization is achieved through a combination of passive and active means.

In some embodiments, the first image sensor is provided on an end effector of a robotic system. In some embodiments, the robotic system comprises a controller and an encoder, wherein the controller and encoder track the position of the end effector. In some embodiments, the controller receives positional data of the clamp. In some embodiments, the positional data of the clamp is provided by a fiducial provided on the clamp and captured by the first image sensor. In some embodiments, the positional data of the clamp is provided by a fiducial provided on the clamp and captured by the second image sensor. In some embodiments, the controller automatically stabilizes the end effector relative to the clamp.

In some embodiments, movement of the end effector is fully automated. In some embodiments, movement of the end effector is controlled by a user as the controller automatically stabilizes the end effector relative to the clamp. In some embodiments, tracking the position of the second image sensor comprises tracking the second image sensor relative to a clamp secured onto at least one tooth. In some embodiments, the first image sensor is provided on an end effector of a robotic system. In some embodiments, the robotic system comprises a controller and an encoder, wherein the controller and encoder track the position of the end effector. In some embodiments, the controller receives positional data of the clamp. In some embodiments, the positional data of the clamp is provided by a fiducial provided on the clamp and captured by the first image sensor. In some embodiments, the positional data of the clamp is provided by a fiducial provided on the clamp and captured by the second image sensor. In some embodiments, the controller automatically stabilizes the end effector relative to the clamp. In some embodiments, movement of the end effector is fully automated. In some embodiments, movement of the end effector is controlled by a user as the controller automatically stabilizes the end effector relative to the clamp.

Provided herein are embodiments of a system for mapping a three-dimensional (3D) dental anatomy of a subject, comprising: a first image sensor of an OCT system: a second image sensor, wherein the second image sensor is a color image sensor; and a computing device comprising a processor and a non-transitory computer readable storage medium with a computer program including instructions executable by the processor causing the processor to: align an OCT image captured by the first image sensor with a color image captured by the second image sensor; and superimpose the color image onto a surface boundary extracted from the OCT image.

In some embodiments, a field of view of the second image sensor is greater than or equal to a field of view of the first image sensor. In some embodiments, the system further comprises a clamp secured onto at least one tooth of the subject, wherein the clamp provides positional data of the dental anatomy of the subject to the computing device.

In some embodiments, the system further comprises a robotic articulation system comprising: a robotic arm comprising an end effector, wherein the end effector couples to the first image sensor and the second image sensor: an encoder system for providing positional data of the robotic arm and the end effector, wherein the positional data of the robotic arm is transmitted to the computing device to facilitate alignment of the OCT image captured by the first image sensor with the color image captured by the second image sensor. In some embodiments, the robotic articulation system further comprises a controller, and wherein the controller receives the positional data of the dental anatomy of the subject from the clamp, and wherein the controller automatically positions the robotic arm to maintain stability of the end effector relative to the clamp.

In some embodiments, the OCT system further comprises light source to illuminate the dental anatomy of the subject. In some embodiments, the light source sequentially illuminates the dental anatomy with a red light source, a green light source, and a blue light source. In some embodiments, each the red light source, the green light source, and the blue light source emit light in a structured pattern. In some embodiments, the red light source, the green light source, and the blue light source each comprise a narrow band light source. In some embodiments, the light source comprises illuminating a white light source, and wherein a red bandpass filter, a green bandpass filter, and a blue bandpass filter are applied sequentially during imaging by the second image sensor. In some embodiments, the white light source emits a structured light pattern. In some embodiments, the second image sensor comprises a color video camera.

Provided herein are embodiments of a system for scanning a 3D dental anatomy of a subject comprising: an emitter emitting a signal; a detector capturing the 3D dental anatomy; and an actuator translating the emitter with respect to the detector.

In some embodiments, the scanning system comprises an array of emitters, an array of detectors, or both. In some embodiments, the detector captures the 3D dental anatomy of a subject while the emitter and the detector are within the mouth of the subject. In some embodiments, the detector detects a signal emitted by the emitter while the emitter is stationary with respect to the detector. In some embodiments, the detector detects the signal emitted by the emitter while the emitter translates with respect to the detector. In some embodiments, the emitter or the detector are stationary with respect to the subject. In some embodiments, the emitter, the detector, or both translate with respect to the subject. In some embodiments, the detector detects the signal emitted by the emitter while the emitter is stationary with respect to the detector. In some embodiments, the emitter and the detector are stationary with respect to the subject. In some embodiments, the emitter and the detector translate with respect to the subject. In some embodiments, the emitter is a light source. In some embodiments, the detector is an optical coherence tomography (OCT) detector, an infrared diffuse optical tomography (DOT) detector, or both. In some embodiments, the emitter is an X-ray emitter, and the detector is an X-ray detector. In some embodiments, the actuator comprises a robot.

Provided herein are embodiments of a system to acquire a single, combined image of a multiplicity of teeth, the system comprising: an OCT imaging device with an intraoral probe: an articulating arm with position and orientation sensors and an end effector; and a computing device comprising a processor and a non-transitory computer readable storage medium with a computer program including instructions executable by the processor causing the processor to calculate the 3D coordinate system transformations for mapping individual OCT image volumes into a single combined image.

In some embodiments, the system further comprises a clamp secured onto at least one tooth of the subject, wherein the clamp provides positional data to provide a reference point of the multiplicity of teeth of the subject to the computing device. In some embodiments, the positional data of the clamp is provided by a fiducial provided on the clamp and captured by the OCT imaging device. In some embodiments, the system further comprises a controller, wherein the controller receives the positional data of the clamp, and wherein the controller automatically positions the robotic arm to maintain stability of the end effector relative to the clamp.

In some embodiments, the system further comprises a light source to illuminate the multiplicity of teeth. In some embodiments, the light source sequentially illuminates the multiplicity of teeth with a red light source, a green light source, and a blue light source. In some embodiments, each the red light source, the green light source, and the blue light source emit light in a structured pattern. In some embodiments, the red light source, the green light source, and the blue light source each comprise a narrow band light source. In some embodiments, the light source comprises a white light source, and wherein a red bandpass filter, a green bandpass filter, and a blue bandpass filter are applied sequentially during imaging by the OCT imaging device. In some embodiments, the white light source emits a structured light pattern.

Provided herein are embodiments of a system to acquire a single, combined image data of a multiplicity of teeth, the system comprising: an OCT imaging device with an intra-oral probe: a supporting fixture rigidly connected to a portion of the dental anatomy with position and orientation sensors and an end effector: a computing device comprising a processor and a non-transitory computer readable storage medium with a computer program including instructions executable by the processor causing the processor to calculate the 3D coordinate system transformations for mapping individual OCT image volumes into a single combined image.

In some embodiments, the supporting fixture provides positional data to provide a reference point of the multiplicity of teeth of the subject to the computing device. In some embodiments, the positional data of the supporting fixture is provided by a fiducial provided on the clamp and captured by the OCT imaging device.

Provided herein are embodiments of a method to a acquire a single, combined image of a multiplicity of teeth, the method comprising: a) capturing a first OCT image of a portion of the dental anatomy using an OCT scanner probe rigidly connected to an articulating arm configured to measure the position and orientation of the OCT scanner: b) moving the articulating arm to a second position and orientation: c) capturing a second OCT image OCT scanner probe capturing a second image of a portion of the dental anatomy which partially overlaps the first image: d) using the relative position and orientation information between the first and second images to create a single volumetric image combining the first and second images; and e) repeating the process from step (b) at subsequent positions and orientations and combining the additional images with the previously combined images to form a single image of an extended portion of the dental anatomy.

Provided herein are embodiments of a system to remove carious lesions from dental anatomy, the system comprising: OCT scanning device configured with an intraoral probe: a dental drill: an articulating arm configured with an end-effector: rigidly connected to the intraoral OCT probe and the dental drill: a computing device to control the movements of the articulating arm.

Provided herein are embodiments of a method to remove carious lesions from dental anatomy comprising: a) scanning the target dental anatomy with an OCT imaging device: analyzing the images to identify carious lesions: b) determining a cutting path for a dental drill connected to a computer controlled active articulating robotic arm: c) moving the dental drill along the cutting path to remove the unwanted material; and d) repeating the process beginning with step (a) until no further carious lesions are detected.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION

Provided herein are embodiments of a system for producing a single, combined volumetric image of an extended portion of a patient's dental anatomy by capturing a multiplicity of volumetric image frames of dental anatomy using an optical coherence tomography (OCT) system with a mechanical motion control system comprising: an OCT imaging device with a probe suitable to be positioned in the mouth to capture OCT volumetric image frames of a portion of the dental anatomy: an articulated arm with multiplicity of joints or axes capable of positioning the arm within the intra-oral cavity and providing sufficient stability to ensure good positional accuracy of the captured OCT images and an end effector: a rigid connection between the end effector of the articulating arm and the intra-oral portion of the OCT imaging sensor: sensors tracking the position and orientation of the imaging sensor: a computer with software to register the multiplicity of frames captured by the OCT imaging system using the tracked position and orientation information to form a single volumetric image of the target dental anatomy.

In some embodiments the articulating arm is comprised of a multiplicity of rigid elements connected by rotational joints or linear axes. In some embodiments the joints are passive. In some embodiments the joints are active and are comprised of electromechanical actuators. In some embodiments the electromechanical actuators are comprised of encoders to capture the position of the motor. In some embodiments linear axes are passive. In some embodiments the linear axes are active and are comprised of electromechanical actuators. In some embodiments the electromechanical actuators are comprised of encoders to capture the position of the motor. In some embodiments the sensors are integrated into the joints and axes. In some embodiments the sensors are separate discrete elements not included in the joints or axes. In some embodiments the sensors are a combination of integrated and discrete elements. In some embodiments, the position and orientation of the imaging sensor is computed from a known relationship between the joint and axis position and orientation sensor information and the imaging sensor.

In some embodiments, stabilization is achieved via electromechanical actuators. In some embodiments, stabilization is achieved via feedback control. In some embodiments, the stabilization is achieved via feedforward control. In some embodiments, the stabilization is achieved via a combination of feedback and feedforward control. In some embodiments, the stabilization is achieved through optical stabilization methods leveraging scanning laser confocal microscopic images, which then feedback to the scanner in OCT scanning mechanisms to actively correct the target motion on the fly. In some embodiments, the stabilization is achieved through a combination of passive and active means.

Figure 3:
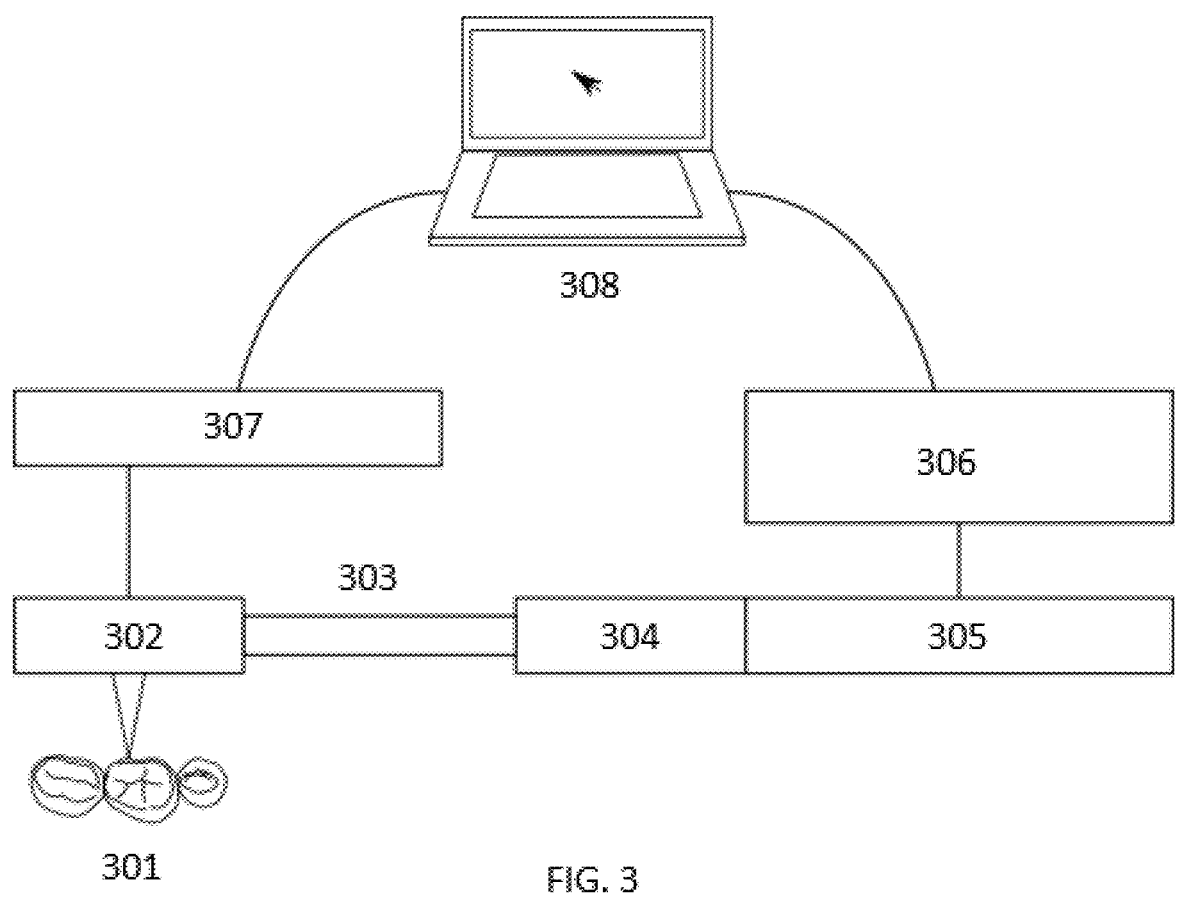
FIG. 3 shows an exemplary block diagram system for intra-oral dental tomography imaging system, according to some embodiments.

In some embodiments, no articulating arm is used and the OCT scanner probe is directly attached to a supporting fixture which is directly, rigidly, and detachably connected to a portion of the patient's dental anatomy. In some embodiments, the scanner probe is rigidly connected to the supporting fixture. In some embodiments, the scanner probe can releasably translate along a linear axis such as a rail or similar device relative to the target tooth to capture images of different portions of the dental anatomy. In some embodiments, the rail supporting the scanner probe can releasably rotate about a portion of the dental anatomy to capture images from a plurality of views of the dental anatomy, as shown in FIG. 3.

In some embodiments, the OCT scanner probe is directly and rigidly attached to a supporting fixture which is directly, rigidly, detachably, or movably connected to the ground. In some embodiments, the patient rests their mandible on a portion of the supporting fixture. In some embodiments, the patient rests their forehead on a portion of the supporting fixture. In some embodiments, the patient rests their mandible and their forehead on the supporting fixture. In some embodiments, the scanner probe is rigidly connected to the supporting fixture. In some embodiments, the scanner probe can releasably translate along a linear axis such as a rail or similar device relative to the target tooth to capture images of different portions of the dental anatomy. In some embodiments, the rail supporting the scanner probe can releasably rotate about a portion of the dental anatomy to capture images from a plurality of views of the dental anatomy.

In some embodiments, tracking the position of the image sensor comprises tracking the image sensor relative to a clamp secured onto at least one tooth. In some embodiments, the first image sensor is provided on an end effector of a robotic system. In some embodiments, the robotic system comprises a controller and an encoder, wherein the controller and encoder track the position of the end effector. In some embodiments, the controller receives positional data of the clamp. In some embodiments, the positional data of the clamp is provided by a fiducial provided on the clamp and captured by the first image sensor. In some embodiments, the positional data of the clamp is provided by a fiducial provided on the clamp and captured by the second image sensor. In some embodiments, the controller automatically stabilizes the end effector relative to the clamp. In some embodiments, movement of the end effector is fully automated. In some embodiments, movement of the end effector is controlled by a user as the controller automatically stabilizes the end effector relative to the clamp.

Provided herein are embodiments of a method for producing a single, combined volumetric image of an extended portion of a patient's dental anatomy by capturing a multiplicity of volumetric image frames of dental anatomy using an optical coherence tomography (OCT) system with a mechanical motion control system comprising: moving a movable OCT imaging sensor to a first position in the oral-cavity: tracking the position and orientation of the OCT imaging sensor; capturing an OCT volumetric image frame; moving the imaging sensor to a second position in the oral-cavity; tracking the second position and orientation; capturing a second OCT image; superimposing the first and second images based on the tracked position and orientation information; and repeating for the steps to sequentially capture and superimpose additional OCT volumetric image frames until the desired portion of the anatomy is captured.

In some embodiments, an image segmentation algorithm is used to extract surface boundary information from the volumetric image frames. In some embodiments, the extracted surface boundary information is used in addition to the position and orientation information to sequentially superimpose the plurality of image volumes.

Provided herein are embodiments of a method to capture additional dental anatomy during an operative procedure by repeatedly capturing an OCT volumetric image after portions of dental anatomy has been removed. Given that OCT has a limited penetration depth, and in some cases visualization is desired below this depth, we have created a process to image this deeper material. The process repeats iteratively alternating between the steps of 1) removing dental anatomy and 2) capturing additional OCT images. In some embodiments the OCT images are analyzed to determine if additional decay is present. In some embodiments, this process is further detailed as 1) removing visible decayed dental anatomy in addition to any required healthy anatomy required to access the decayed material and 2) capturing additional OCT images that capture additional dental anatomy.

In some embodiments, the process continues until no further decay is found in the OCT images. In some embodiments, the OCT images are analyzed by the system operator, to determine the presence and location of any additional carious lesions. In some embodiments, the OCT images are analyzed by an AI algorithm, such as a convolutional deep neural network (CNN), to determine the presence and location of any additional carious lesions.

Provided herein are embodiments of systems and methods for intra-oral scanning using optical coherence tomography (OCT). In some embodiments, a 3D model of intra-oral surfaces is generated using the data captured from the OCT scan.

I. Automated Modular Dental Positioning System

In some embodiments, a modular multi-degree of freedom dental positioning system for use in dental scanning is provided. In some embodiments, a dental end effector is provided. In some embodiments, the dental end effector comprises a probe for an optical coherence tomography (OCT) scanner, a micro computed tomography scanner, an intraoral X-ray computed tomography scanner, a near-infrared optical tomography scanner, a diffuse optical tomography scanner, a diffuse optical imaging scanner, an ultrasound scanner, or a combination thereof.

In some embodiments the dental positioning system tracks patient movement with a static or dynamic registration system to register the robotic base to the tooth anatomy.

In some embodiments, the dental positioning system comprises an active articulating arm comprised of a multiplicity of rigid elements connected by rotational joints or linear axes configured to translate and rotate (position) the dental end-effector in a plurality of degrees of freedom. In some embodiments the joints and axes are passive. In some embodiments, a plurality of the joints and axes are active and are comprised of electromechanical actuators. In some embodiments, the electromechanical actuators are comprised of encoders to capture the position of the motor. In some embodiments, linear axes are passive. In some embodiments, the linear axes are active and are comprised of electromechanical actuators. In some embodiments the electromechanical actuators are comprised of encoders to capture the position of the motor. In some embodiments the sensors are integrated into the joints and axes. In some embodiments the sensors are separate discrete elements not included in the joints or axes. In some embodiments the sensors are a combination of integrated and discrete elements. In some embodiments, the position and orientation of the imaging sensor is computed from a known relationship between the joint and axis position and orientation sensor information and the imaging sensor.

In some embodiments, translation of the dental end-effector is tracked relative to a mouthpiece housing configured to be at least partially positioned in a subject's mouth. In some embodiments, translation of the dental end-effector is tracked relative to a tooth clamp attached to a tooth or teeth of the subject. In some embodiments, translation of the dental end-effector is tracked relative to both a mouthpiece housing configured to be at least partially positioned in a subject's mouth and a tooth clamp.

In some embodiments, the dental positioning system comprises a unidirectional data connection between the end effector and control and/or data acquisition system. In some embodiments, the dental positioning system comprises a bidirectional data connection between the end effector and control and/or data acquisition system. In some embodiments, the dental positioning system comprises a multidirectional data connection between the end effector and control and/or data acquisition system.

In some embodiments, the position and orientation information for the OCT probe relative to the teeth is utilized as an input for image stitching. In some embodiments, positional information for the OCT relative to the teeth enables larger volumes to be imaged. In some embodiments, when the relative location of each scan is known, along with the optical details of the scanner, it allows for the combination of multiple OCT scans into a larger volume. In some embodiments, the OCT scanner is held sufficiently steady during the scan, such that distortions and/or motion artifacts are suppressed.

II. Automated OCT Dental Registration System

In some embodiments, the OCT is used to calibrate the registration of the device to the tooth surface with high precision. In some embodiments, the OCT scans the tooth with the end effector in the frame. In some embodiments, the OCT scans the tooth with a tooth clamp in the frame. In some embodiments the OCT increases the precision of the tooth clamp registration. In some embodiments, the tooth, the tooth clamp, and the end effector are captured in the frame. In some embodiments, calibration using OCT is performed in real time. In some embodiments, calibration using OCT is performed pre-operatively. In some embodiments, calibration using OCT is performed asynchronously.

III. Automated Stabilized Intraoral Dental Scanner System

A modular multi-degree of freedom dental positioning system may comprise one or more imaging sensors. The one or more imaging sensors may comprise an OCT scanner, a scanning laser confocal microscope, an intraoral scanner, a fluorescence imager, an image sensor, a micro CT scanner, an intraoral x-ray CT, a camera, an diffuse optical tomography scanner, an diffuse optical imaging scanner, a near-infrared optical tomography scanner, a video camera, a color camera, a color video camera, a three dimensional camera, or ultrasound scanner, an optical intraoral surface scanner, or a combination thereof. In some embodiments, the one or more imaging sensors are stabilized to a tooth. In some embodiments, the one or more sensors are stabilized to a plurality of teeth. In some embodiments, the one or more sensors are stabilized to a jaw. In some embodiments, the system stabilizes the sensor relative to the tooth, plurality of teeth or to a jaw to reduce motion artifacts. In some embodiments, the dental positioning system comprises one or more degrees of freedom. In some embodiments, the system comprises at least 5 degrees of freedom.

In some embodiments, the stabilization is achieved through passive (i.e. open-loop) means, via the mechanical design of the stabilization system. In some embodiments, the stabilization is achieved through active means, via electro-mechanical actuators. In some embodiments, the active stabilization is achieved via feedback control. In some embodiments, the active stabilization is achieved via feedforward control. In some embodiments, the active stabilization is achieved via a combination of feedback and feedforward control.

In some embodiments, the stabilization is achieved through optical stabilization methods leveraging scanning laser confocal microscopic images, which then feedback to the scanner in OCT scanning mechanisms to actively correct the target motion on the fly. In some embodiments, the stabilization is achieved through a combination of passive and active means. In some embodiments, the stabilization is achieved through optical stabilization methods leveraging lenses.

A. Manually-Actuated Dental Scanner Stabilization System

A manually-actuated modular multi-degree of freedom dental positioning system may comprise one or more imaging sensors. The one or more imaging sensors may comprise an OCT scanner, a scanning laser confocal microscope, an intraoral scanner, an image sensor, a micro CT scanner, an intraoral x-ray CT, an diffuse optical tomography scanner, an diffuse optical imaging scanner, a near-infrared optical tomography scanner, a fluorescence imager, an intraoral or extraoral Infrared Laser CT, a camera, video camera, a color camera, a color video camera, a three dimensional camera, or ultrasound scanner, or a combination thereof. In some embodiments, the one or more imaging sensors are stabilized to a tooth. In some embodiments, the one or more imaging sensors are stabilized to a plurality of teeth. In some embodiments, the one or more sensors are stabilized to a jaw. In some embodiments, the system stabilizes the imaging sensor relative to the tooth to reduce motion artifacts. In some embodiments, the dental positioning system comprises one or more degrees of freedom. In some embodiments, the system comprises at least 5 degrees of freedom.

In some embodiments there is passive stabilization but automated positioning. In some embodiments there is passive stabilization but controlled mechanical positioning. In some embodiments there is passive stabilization and manual positioning. In some embodiments there is a static fixture that connects the imager to the target tooth. This static fixture could have one fixed position, a variety of fixed positions, or contain some form of rail system. In some embodiments, the clinician-utilized and clinician-known finger resting techniques enable the clinician to perform macro tracking of the patient's head movements, and optical or another stabilization method described above performs micro level tracking and stabilization.

IV. OCT Probe

In some embodiments, the OCT scanner comprises a probe that is designed to scan a point focused OCT beam across the target surface in the sample arm of a TD (time-domain) OCT, SD-OCT (spectral domain), and/or SS-OCT (swept source). In some embodiments, the OCT scanner is a probe that is designed to scan a line-focused OCT beam across the target surface in the sample arm of a line field TD OCT, SD-OCT, and/or SS-OCT. In some embodiments, the OCT scanner is a probe that is designed to scan a parallel OCT beam (uniform light field beam) across the target surface in the sample arm of a full field TD OCT, and/or SS-OCT. In a preferred embodiment, the OCT scanner comprises a SS-OCT with a central wavelength of 1310 nm, swept over a range of about 100 nm.

In some embodiments, the light source is a broadband light source. In some embodiments, the light source is an incandescent source. In some embodiments, the light source is a gas discharge source. In some embodiments, the light source is a light-emitting diode. In some embodiments, the light source is a super luminescent diode (SLD). In some embodiments, the light source is an ultrashort pulsed laser. In some embodiments, the light source is a supercontinuum laser. In some embodiments, the light source is a combination of light sources with different emission wavelengths and bandwidths. In some embodiments, the light source is a laser. In some embodiments, the light source is a wavelength-swept laser that can sweep a range of wavelengths. In some embodiments, the light source is an optical frequency swept laser that can sweep a range of optical frequencies. In some embodiments, the light source is not a laser. In some embodiments, the light source is not collimated. In some embodiments the source light beam is focusing or diverging. In some embodiments, the light source has a focal point on the surface of the object to be imaged. In some embodiments, the light source has a line-focused beam on the surface of the object to be imaged. In some embodiments, the OCT scanner emits light from more than one location. In some embodiments, the OCT scanner emits a uniform light field.

In some embodiments, the OCT probe captures data with a plurality of wavelengths at a single position of the tooth of a patient relative to the OCT probe. In some embodiments, the OCT probe captures data with a plurality of optical frequencies at a single position of the tooth of a patient relative to the OCT probe. In some embodiments, the systems herein do not comprise or employ a projector for structured illumination.

In some embodiments, the system uses polarization sensitive detection of the OCT signals realized by polarization optics (including polarizers, waveplates, Faraday rotators, polarizing optic fibers, polarization-maintaining optic fibers, et cetera, or a combination thereof) in the OCT system and OCT probe to improve the magnitude of OCT signals returned from pathological material in a tooth relative to OCT signals returned from sound tissue. The pathological material includes carious lesions, white spots, dental filling, dental implant material et cetera.

In some embodiments, the system uses polarization sensitive detection of the OCT signals realized by polarization optics (including polarizers, waveplates, Faraday rotators, polarizing optic fibers, polarization-maintaining optic fibers, et cetera, or a combination thereof) in the OCT system and OCT probe to obtain the phase retardation of OCT signals returned from pathological material in a tooth relative to OCT signals returned from sound tissue. The pathological material includes carious lesions, white spots, dental filling, dental implant material et cetera.

In some embodiments, the system uses polarization sensitive detection of the OCT signals realized by polarization optics (including polarizers, waveplates, Faraday rotators, polarizing optic fibers, polarization-maintaining optic fibers, et cetera, or a combination thereof) in the OCT system and OCT probe to obtain both amplitude and phase retardation of OCT signals returned from pathological material in a tooth relative to OCT signals returned from sound tissue. The pathological material includes carious lesions, white spots, dental fillings, dental implant material et cetera.

In some embodiments, the OCT beam is applied to a target area to perform high-resolution imaging to identify cavities, tooth decay, or other tooth defects. In some embodiments, the resolution is varied. In some embodiments, the system captures a 3D OCT scan of part of the dental anatomy with a relatively large field of view and large lateral scanning interval as a means to quickly generate a relatively low resolution 3D volumetric image. In some embodiments, a smaller field of view and smaller lateral scanning interval is used to generate higher resolution 3D volumetric images of areas of interest of the dental anatomy.

In some embodiments, the location of a designated point on a stationary body holding the modular multi-degree of freedom dental positioning system is taken as the origin of a coordinate system ("the origin"). In some embodiments, the stationary body is a mechanical positioning system. In some embodiments, position and orientation sensors embedded in the dental positioning system are used to provide the relative position of the OCT head to the origin. In some embodiments, the joint angle and linear axis position encoders in the positioning system are used to provide the relative position of the OCT head to the origin. In some embodiments, the relative position of the OCT head to the origin is used to define a coordinate transformation matrix. In some embodiments, the coordinate transformation matrix is then used to transform the coordinates of the OCT data coming from the OCT scanner into the coordinate system of the mechanical positioning system's body. In some embodiments, a plurality of OCT scans, taken from different positions and orientations are transformed into the coordinate system of the mechanical positioning system's body and are thereby used to generate a single volumetric 3D model of an extended volume of dental tissue (such as a dental arch). In some embodiments, other image registration techniques are used as an adjunct to the aforementioned coordinate transformation method to provide more accurate image registration between OCT scans. In some embodiments, a segmentation algorithm is used to extract 3D surface information from the OCT scans corresponding to the exterior surface of the plurality of teeth captured in the OCT image. In some embodiments, surface registration algorithms, such as the Iterative Closest Point (ICP) algorithm based on the extracted surface information are used to register a plurality of OCT scans for improved accuracy. In some embodiments, the ICP algorithm is used in combination with the position and orientation information provided from the positioning system to improve the accuracy of the volumetric image registration.

In some embodiments, spatial distortions in the collected OCT dataset (such as lens distortions) are removed by pre-calibration. In some embodiments, this pre-calibration is obtained by measuring the properties of the OCT probe system and the optics used to obtain the OCT signal. In some embodiments, this pre-calibration is obtained by simulating the properties of the OCT system and the optics used to obtain the OCT signal using physics based simulations, for example using geometrical optics and ray tracing methods. In some embodiments, this pre-calibration is obtained by a combination of measurements on and physics-based simulations of the OCT system and the optics used to obtain the OCT signal.

In some embodiments, multiple OCT images that are taken from different positions, orientations, or perspectives of the same target by manipulating the OCT scanner are registered and combined to create a more complete OCT data set. In some embodiments, the manipulation of the OCT scanner relative to the same target is performed manually. In some embodiments, the manipulation of the OCT scanner relative to the same target is performed automatically by a mechanical positioning system, such as a robotic system. In some embodiments, the registration of these multiple images is aided by using the coordinate system data of an OCT scanner on a mechanical positioning system. In some embodiments, overlap between adjacent OCT images is used to register OCT images together. In some embodiments, 5-15% of the OCT images overlap to register the OCT images together. In some embodiments, 15-20% of the OCT images overlap to register the OCT images together. In some embodiments, 20-30% of the OCT images overlap to register the OCT images together. In some embodiments, 30-40% of the OCT images overlap to register the OCT images together. In some embodiments, 40-50% of the OCT images overlap to register the OCT images together. In some embodiments, 50-60% of the OCT images overlap to register the OCT images together. In some embodiments, 60-70% of the OCT images overlap to register the OCT images together. In some embodiments, 70-80% of the OCT images overlap to register the OCT images together. In some embodiments, 80-90% of the OCT images overlap to register the OCT images together. In some embodiments, 90-99% of the OCT images overlap to register the OCT images together.

In some embodiments, the surface information of the sample target extracted from 3D OCT datasets may be used for registration of other captured OCT images. In some embodiments, a plurality of OCT images that are taken repeatedly from the same target by the OCT scanner are registered and combined/averaged to create an improved quality of the final OCT data set.

At interfaces between optically dissimilar materials (e.g., air and enamel such as a small air gap between interproximal surfaces, or the interface between gingiva and enamel) more intense reflections typically result. In some embodiments, the first surface detected by OCT beyond an air gap is identified as a tooth or gingival surface. In some embodiments, a segmentation algorithm is used to identify surfaces of the tooth, including those in interproximal and subgingival regions where the surface of the tooth may be occluded. In some embodiments, segmentation by machine learning is used to identify surfaces of the tooth, including in interproximal and subgingival regions where the surface of the tooth may be occluded. In some embodiments, an edge detection algorithm is utilized to identify tooth or gingival surfaces. In some embodiments, other computer vision techniques, such as artificial intelligence image recognition are utilized to identify tooth or gingival surfaces.

In some embodiments, multiple images are utilized to infer a contour of an occluded surface. In some embodiments, the scanner (e.g., an intraoral image scanner) captures a plurality of images proximal to the occluded surface. In some embodiments, multiple scanners simultaneously capture a plurality of images proximal to the occluded surface. In some embodiments, the multiple scanners are provided on a single intraoral probe.

Figure 2A:
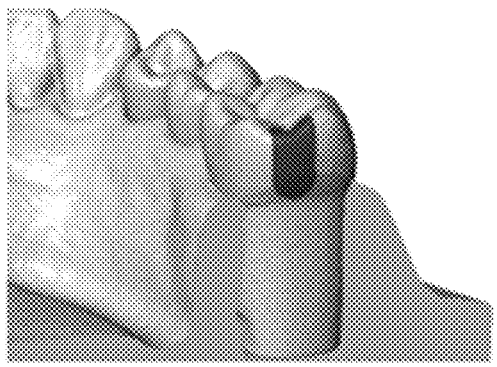
FIGS. 2A-2C depict an occluded intra-oral region for modeling, according to some embodiments.
Figure 2B:
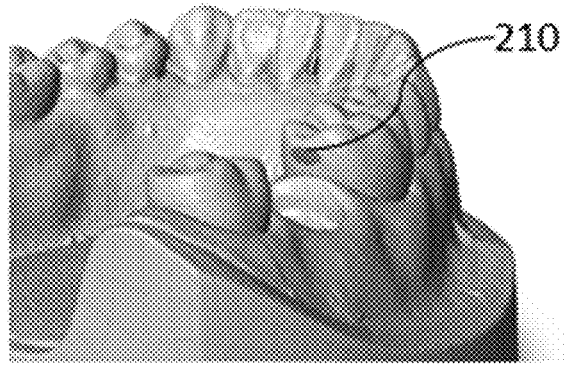
Figure 2C:
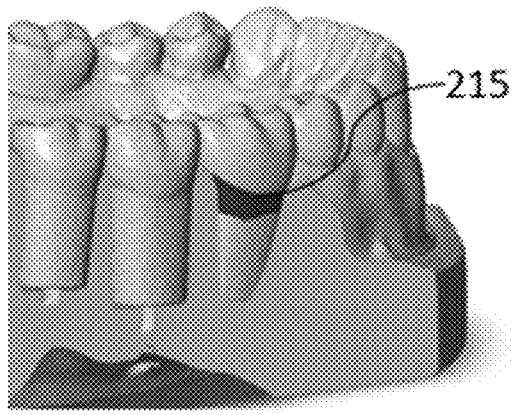

With reference to FIGS. 2A-2C, occluded surfaces which may be inferred by the system and methods described herein are depicted. With reference to FIG. 2A and FIG. 2B, an occluded surface which may be visually blocked by an adjacent tooth may be inferred by the system and methods, as described herein. In some embodiment, with reference to FIG. 2B, a three-dimensional representation of a dental anatomy allows for an adjacent tooth to be removed from the representation, such that representation of an occluded surface 210 is able to be observed. In some embodiment, with reference to FIG. 2C, a three-dimensional representation of a dental anatomy allows for visualization of a subgingival surface 215.

In some embodiments 3D surface mapping via laser scanning is used to facilitate the co-registration of multiple 3D OCT volumetric datasets. In some embodiments 3D surface mapping, via laser confocal scanning or other optical intra-oral scanning device, is used to facilitate the co-registration of multiple 3D OCT volumetric datasets. In some embodiments, the surface contour information of an object is inferred entirely from the 3D OCT data.

V. Automated OCT Guided Robotic Dental Surgical System

Provided herein are embodiments of a system and method to capture extended dental anatomy during an operative procedure by repeatedly capturing an OCT volumetric image after portions of dental anatomy have been removed. In some embodiments, the system, comprises an articulated arm with an end-effector wherein the end-effector is rigidly connected to a dental drilling device and to an intraoral imaging device capable of capturing a portion of the internal structure of a tooth, such as an OCT scanner, as in FIG. 2. In some embodiments, the system comprises a computer connected to the OCT scanner. In some embodiments, the system includes a computer display screen configured to show the images captured by the OCT scanner.

In some embodiments, the articulated arm is a motorized robotic arm. In some embodiments, the articulated, motorized robot arm comprises a controller connected to the computer. In some embodiments the computer controls the movement of the articulated arm.

In some embodiments, the articulated arm is passive. In some embodiments, a human operator controls the articulated arm.

In some embodiments the articulated arm tracks patient movement with a static or dynamic registration system to register the robotic base to the tooth anatomy.

In some embodiments, the method begins by capturing an intraoral OCT scan of a portion of a tooth. The captured dental anatomy is analyzed to determine the location of carious lesions (dental decay). In some embodiments, a human operator analyzes the images shown on the computer display to determine if additional carious lesions are present and their location.

In some embodiments, the captured dental anatomy is analyzed by a trained AI algorithm, such as a convolutional deep neural network (CNN), to determine the presence and location of any additional carious lesions. In some embodiments, the AI determines a movement path of the articulated arm, thereby moving the dental drilling device to remove unwanted material.

The process repeats iteratively alternating between the steps of 1) removing visible decayed dental anatomy in addition to any required healthy anatomy required to access the decayed material and 2) capturing additional OCT images until no further decay is identified in the OCT images.

A. Scan Head

In some embodiments, the scanning head (OCT, or IOS, or a scanning laser confocal microscope, or micro CT, an intraoral x-ray CT, an x-ray emitter, an x-ray detector, a diffuse optical tomography scanner, a diffuse optical imaging scanner, a near-infrared optical tomography scanner, an intraoral or extraoral Infrared Laser CT or video camera, etc.) is not handheld. In some embodiments, the scanning head is mechanically actuated either manually (e.g., by turning a knob coupled to a translation or rotation stage) or automatically (e.g., by a motor).

In some embodiments a modular multi-degree of freedom dental positioning system for use in a dental scanning procedure acts to stabilize the scanner relative to the tooth to reduce motion artifacts. In some embodiments, the stabilized scanner is an OCT scanner. In some embodiments, the stabilized scanner is an intraoral scanner. In some embodiments, the OCT scanner includes a scanning laser confocal microscopy scanning mechanism. In some embodiments, the stabilized scanner is a video camera. In some embodiments, the stabilized scanner is a micro CT. In some embodiments, the stabilized scanner is an ultrasound. In some embodiments, the stabilized scanner is an intraoral x-ray CT. In some embodiments, the stabilized scanner is an intraoral or extraoral Infrared Laser CT. In some embodiments, the stabilized scanner is a diffuse optical tomography scanner. In some embodiments the stabilized scanner is a diffuse optical imaging scanner, in some embodiments the stabilized scanner is a near-infrared optical coherence tomography scanner. In some embodiments, the stabilized scanner is a combination of two or more of these above embodiments. In some embodiments, a mechanical structure for the scanning part or all of the dental anatomy reduces motion artifacts from the image capture process for any of the scanning modalities identified above.

B. OCT probe with Integrated Intraoral Scanner (IOS) or Integrated Video Camera

In some embodiments, the device uses a second scanner adjunct to an OCT scanner with a separate optical path (such as the embodiment in which the two scanners are spatially adjacent to each other but have separate optical paths). In some embodiments, data from both scanners may be captured concurrently, sequentially, or interleaved in time. In some embodiments, a mechanical structure for the scanning of an arch or half an arch reduces motion artifacts from the image capture process of OCT, intraoral scanning, or video capture.

1. With Integrated Video Camera/Color Surface Scanning

In some embodiments, one scanner is an OCT scanner and one scanner is a still or video camera. In some embodiments, one scanner is an OCT scanner and one scanner is a scanning laser confocal microscopy scanner. In some embodiments, at least one scanner comprises an OCT scanner, an intraoral scanner, a scanning laser confocal microscopy scanner, an image sensor, a micro CT scanner, an intraoral x-ray CT, an intraoral or extraoral Infrared Laser CT, an diffuse optical tomography scanner, an diffuse optical imaging scanner, a near-infrared optical tomography scanner, a, a camera, video camera, a color camera, a color video camera, a three dimensional camera, or ultrasound scanner, or a combination thereof in some embodiments, the video camera images are registered onto the 3D surface extracted from previously-collected OCT scan data. In some embodiments, the still or video data is not used to register the OCT data.

In some embodiments, at least two scanners are provided. In some embodiments, a first scanner comprises an OCT scanner and a second scanner comprises a color camera. In some system embodiments, a known relative position and orientation between the color camera and OCT scanner are used to map the color image onto a 3D surface imaged by OCT. The relative position and orientation are generated by the 3D OCT data. In some embodiments, the mapping of color image onto the 3D surface of OCT data is done by registration of the color image with a 2D projection image generated from 3D OCT data.

In some embodiments, the color images mapped onto the surface of the OCT data is utilized to highlight tooth defects, such as cavities, chips, and tooth decay. In some embodiments, the intraoral scanning system also maps gingival surfaces. In some embodiments, color images are mapped onto the gingival surfaces. In some embodiments, the color images mapped onto the surface of the OCT data are utilized to highlight gingival defects such as gingivitis, periodontal disease, gum recession, and areas of excess plaque.

In some embodiments, intensity levels of the obtained color images are analyzed to locate and or highlight tooth defects and gingival defects. In some embodiments, computer vision techniques such as edge detection and nearest neighbor algorithms are used to identify tooth and gingival defects.

In some embodiments, the 3D OCT data and a live video are captured simultaneously, sequentially, or interleaved between the two. In some embodiments, 3D OCT data and live video data are taken from different points of view. In some embodiments, the 3D OCT data and the live video are not co-registered. In some embodiments, the 3D OCT data and the live video are distinct. In some embodiments, the video camera's field of view is greater than or equal to the field of view of the OCT scanner.

In some embodiments, the video camera's field of view is illuminated with a broadband visible light source with or without bandpass filters. In some embodiments, the video camera's field of view is illuminated with a broadband incandescent lamp. In some embodiments, the video camera's field of view is illuminated with a broadband visible-range discharge lamp. In some embodiments the video camera's field of view is illuminated with a broadband visible-range LED. In some embodiments, the light source is a superluminescent LED. In some embodiments, the light source is a laser. In some embodiments, the light source is a broadband laser. In some embodiments, the light source is a narrowband laser. In some embodiments, the light source is a plurality of lasers. In some embodiments, the plurality of lasers emit light at a plurality of wavelengths. In some embodiments, the light source is not an LED light, a laser, or either. In some embodiments, the camera's field of view is illuminated by a light source that is located in a housing separate from the camera's housing. In some embodiments, one or more fiber optic cables are used to transmit the light from the illumination light source to the camera's field of view. In some embodiments, the plurality of lasers emit light at red, green, and blue wavelengths.

In some embodiments, a broadband visible-range LED illuminates the dental tissue and a color camera is used to capture a color image of the outer surface of the dental tissue. In some embodiments, the captured color image is mapped onto a 3D surface imaged by OCT. In some embodiments, OCT captures the data, the outer surface of the dental tissue is extracted from the OCT data, then the color image is mapped onto the surface image to provide a representation of a tooth surface. In some embodiments, the system includes a display as color rendering depends on the details of both the camera/light source and of the display. In some embodiments, the captured image is processed and displayed on a calibrated monitor such that the colors are rendered accurately.

In some embodiments, the accurately rendered colored surface map is used by a dentist for analysis of the colors of the dental anatomy. In some embodiments, a 3D dental surface is extracted from the OCT data for further use (such as planning a cut path) but is not displayed to the user.

2. OCT with Intraoral Scanning

In some embodiments, 3D surface data of the dental anatomy is collected via one or more 3D intraoral scanning (IOS) methods. In some embodiments, images or video are registered onto the 3D surface extracted from previously-collected 3D IOS scan data.

In some embodiments, the 3D IOS data and a live video or images are captured simultaneously, sequentially, or interleaved between each other. In some embodiments, 3D IOS data and live video or image data are taken from different points/perspectives of view. In some embodiments, the 3D IOS data and the live video or images are not co-registered. In some embodiments, the 3D IOS data and the live video or images are distinct. In some embodiments, a 3D IOS scan of a tooth/teeth is used to generate 3D models of tooth surfaces. In some embodiments, OCT data, 3D scan data, or a combination thereof, are used to generate a 3D model of tooth surface geometry/topology.

In some embodiments, triangulation is used to measure a 3D surface of dental anatomy. In some embodiments, a transformation matrix is applied to a triangulated surface scan to register it with collected 3D OCT data. In some embodiments, the 3D IOS uses at least 2 spatially-separated positions from which predictable patterned light is projected onto a surface along with one or more video cameras to infer 3D surface data. The patterned light may be generated using a 1D or 2D array of projectors or an illuminated 1D or 2D diffraction grid.

In some embodiments, the 3D IOS uses a diffractive optical array (which is arranged in 1D or 2D and which a light source is swept across in a linear or zig-zag fashion to illuminate the target with a blended continuous set of changing patterns) along with one or more video cameras to infer 3D surface data. In some embodiments, the diffractive optical array is modified on-the-fly to achieve optimal depth-resolution and minimal occlusion. In some embodiments, the diffractive optical array is a deformable mirror array. In some embodiments, the diffractive optical array is a spatial light modulator array. In some embodiments, the diffractive optical array is a deformable lens array.

In some embodiments, the 3D IOS uses a multitude of structured light patterns of different wavelengths in combination with a multi-wavelength filter on the imaging sensor. For example, three offset patterns of blue, green, and red light may be used with an imaging sensor with a Bayer filter. In some embodiments, the 3D IOS uses non-imaging optics to create a highly-detailed structured light pattern simulating laser speckles as point illuminations along with one or more video cameras to infer 3D surface data. In some embodiments, the 3D IOS uses non-imaging optics to create a highly-detailed laser speckle pattern as point illuminations along with one or more video cameras to infer 3D surface data.

In some embodiments, the 3D IOS uses a set of simultaneously-projected structured patterns from spatially-distinct sources which may be imaged simultaneously and later optically or digitally decomposed into separate images from each source (via filtering or optical Fourier filtering or digital Fourier filtering, for example) along with one or more video cameras to infer 3D surface data.

In some embodiments, the IOS generates a point cloud as part of a 3D scanning procedure. In some embodiments, IOS data is evaluated by assigning weights to 3D surface data based on the density of point cloud data in the sampled region. In this embodiment, points are added to a 3D model once they are determined to be valid using the aforementioned weights. In some embodiments, data are given a weight of 0) in which case the data is not included. In some embodiments, data are given a weight less than some threshold value, in which case the data is not included.

In some embodiments, IOS data is included based on a fit to an initial model estimate generated by other means, such as a machine learning generated model. The model estimate is refined from the initial as more IOS data is included into the model. In some embodiments, the machine learning algorithm includes a convolutional deep neural network (CNN) method.

In some embodiments, continuous and/or analytical surface fitting algorithms are used to determine the validity of 3D surface data. For example, in some embodiments, covariance determinants and/or Cramer-Rao bounds are used to determine whether measured points belong to a surface.

Figure 1:
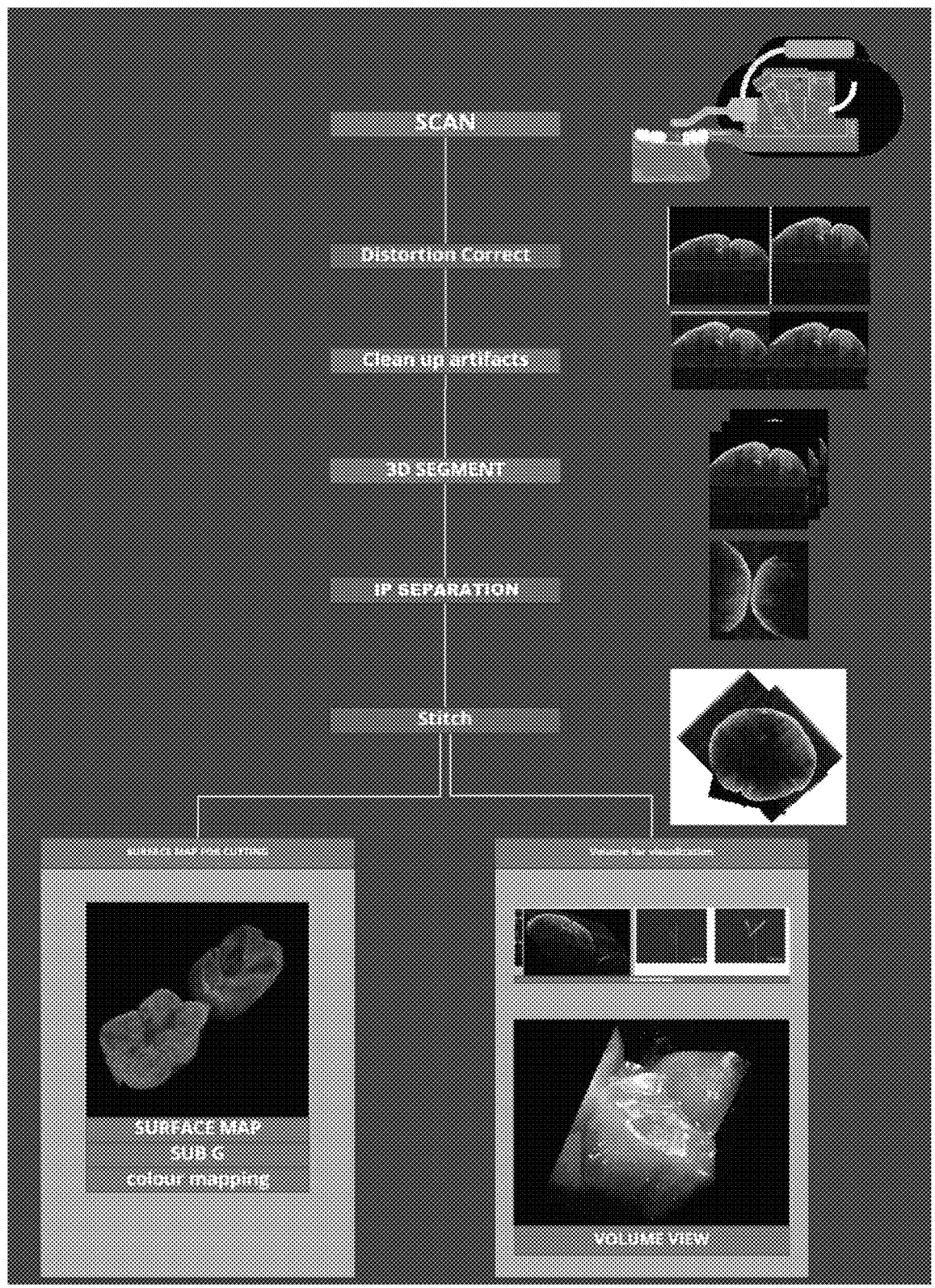
FIG. 1 depicts a method of forming a 3D model, according to some embodiments.

In some embodiments, artificial intelligence (AI) or machine learning methods are used to create 3D models from point cloud data. In some embodiments, a Generative Adversarial Network (GAN) is used to create 3D models from point-cloud data. In FIG. 1, the red boxes refer to AI that takes existing 3D tooth models and modifies them with "noise" from transient 3D models (fingers, lips, cheeks, tools). The blue boxes refer to AI that detects and removes these outliers to create a resulting model as close to baseline as possible. The success of each iteration of the GAN is measured by comparing the result and the baseline 3D models. In some embodiments, a Convolutional Neural Network (CNN), uses jaw and tooth symmetries extracted by training on sampled data sets to map point clouds to 3D models of teeth without artifacts.

In some embodiments, outlying points are removed based on the magnitude of their deviation from a mean location. In some embodiments, outlying points are removed based on the points ordered in the sample sequence and the fit to a smooth, e.g., piecewise continuous polynomial, surface. In some embodiments, outlier points are automatically removed without the use of weights. In some embodiments, machine learning is used to identify and remove outliers in 3D scan data.

FIG. 1 depicts embodiments of a method workflow. In some embodiments, steps in red represent AI models taking existing 3D tooth models and modifying them with "noise" from transient 3D models (fingers, lips, cheeks, tools). In some embodiments, steps in blue represent AI models detecting and removing these outliers to get it back to baseline.

In some embodiments, blue AI by is trained by comparison to baseline anomaly-free model metrics (gray) In some embodiments, red AI is trained to improve anomaly addition using blue performance metrics (gray) In some embodiments, in operation, only the blue AI exists and performs operations similar to those above.

In some embodiments, FIG. 1 may be interpreted as a diagram of the GAN training approach. In some embodiments, training starts with an Anomaly-free Model (gray) In some embodiments, the method comprises injecting simulated anomalies (red AI). In some embodiments, the method comprises converting to point clouds (red AI). In some embodiments, the method comprises reading in point clouds (blue AI). In some embodiments, the method comprises detecting and removing anomalies in point-cloud space (blue AI). In some embodiments, the method comprises segmentation the 3D model (blue AI). In some embodiments, the method comprises detecting and removing anomalies in 3D-model space (blue AI).

VI. Positioning and Localization Systems

In some embodiments, the positioning and localization system consists of a static fixture, a static fixture with various positions, a static fixture with rails, powered robotics unpowered robotics, external fiducials or internal fiducials combined with cameras on the tooth, device, or externally placed, gyroscopes, and any combination thereof.

In some embodiments, having a knowledge of the spatial relationship between multiple volumes/images, or having a better initial estimate will reduce the computation time. If the spatial relationship between multiple images is not exact, knowledge of the spatial relationship allows seeding of the calculator allowing convergence on the spatial relation faster.

A. Controlled Scanning System

Provided herein is a system for scanning a 3D dental anatomy of a subject. In some embodiments, the system comprises an emitter, a detector, and an actuator translating the emitter with respect to the detector. In some embodiments, the scanning system does not comprise the actuator, wherein the emitter is configured to be manually translated with respect to the detector. In some embodiments, the scanning system comprises one emitter and one detector. In some embodiments, the scanning system comprises one emitter and an array of detectors. In some embodiments, the scanning system comprises an array of emitters and one detector. In some embodiments, the scanning system comprises an array of emitters and an array of detectors. In some embodiments, the 3D dental anatomy of a subject is captured while the emitter and the detector are within the mouth of the subject.

In some embodiments, the detector detects a signal emitted by the emitter while the emitter is stationary with respect to the detector. In some embodiments, the detector detects a signal emitted by the emitter while the emitter translates with respect to the detector.

In some embodiments, the detector detects a signal emitted by the emitter while the emitter is stationary with respect to the detector, wherein the emitter and the detector are stationary with respect to the subject. In some embodiments, the detector detects a signal emitted by the emitter while the emitter is stationary with respect to the detector, wherein the emitter and the detector translate with respect to the subject. In some embodiments, the detector detects a signal emitted by the emitter while the emitter translates with respect to the detector, wherein the detector is stationary with respect to the subject. In some embodiments, the detector detects a signal emitted by the emitter while the emitter translates with respect to the detector, wherein the detector, the emitter, or both is stationary with respect to the subject.

In some embodiments, the emitter is a light source, wherein the detector is a diffuse optical tomography (DOT) detector. In some embodiments, the emitter is a light source, wherein the detector is an infrared diffuse optical tomography (DOT) detector. In some embodiments, the emitter is an X-ray emitter, wherein the detector is an X-ray detector. In some embodiments, the actuator comprises a robot.

In some embodiments, the present disclosure herein includes a robotically, manually, stent guided, or hand controlled scanning system where the scanner is comprised of at least an emitter and detector. The scanner moves to capture the required 3D Volume, and/or holds the scanner stationary relative to the patient's anatomy to reduce motion artifacts. In some embodiments the scanning method employs diffuse optical tomography where the illumination is handled using a single or an array of light sources, and detection is handled using a single or an array of detectors surrounding the imaged object, where the sources and detectors are both located intraorally. In some embodiments the scanning method employs infrared diffusion tomography where the illumination is handled using a single or an array of infrared light sources, and detection is handled using a single or an array of detectors surrounding the imaged object, where the sources and detectors are both located intraorally. In some embodiments the scanning method employs X-ray computed tomography where the illumination is handled using a single or array of source and detection is handled using a single or an array of detectors surrounding the imaged object, where the source(s) and detector(s) are both located intraorally. In some embodiments, the sensor may be held stationary, and emitter may be moved relative to the target anatomy (for example the tooth). In some embodiments, the sensor may be moved relative to the target anatomy (for example the tooth), the emitter may be held stationary. In some embodiments, both the sensor and the emitter are moved. These components are moved so as to capture more data from a variety of locations to reconstruct the target tissue in 3D to guide a surgical robot.

VII. 3D Model Data Display Methods

In some embodiments, a 3D model of a tooth is displayed in a shaded view, a cross sectional view, a partially transparent view, a shadow view; or any combination thereof. In some embodiments, a 3D model of a tooth is not displayed as a wireframe rendering. In some embodiments, a 3D model of a tooth is displayed in at most two cross-sectional planes. In some embodiments, a 3D model of a tooth is displayed with a contrast based on a slider input, a determined area of interest, or both. In some embodiments, color tooth surface data can be toggled on or off or made to have varying opacity by the user.

A. Uses of Collected Data

In some embodiments, OCT data or 3D volume data is used to generate a 3D model of a part or all of a patient's dental anatomy (a whole tooth, a whole arch, the buccal bite registration region, etc.). This model may include 3D surface data (which may include occluded surfaces such as subgingival tooth surfaces), 3D volumetric data, or both.

In some embodiments, OCT Data or 3D volume data is used to guide robotic dental surgery. In some embodiments OCT is used to guide robotic dental surgery with pre-surgical images. In some embodiments OCT or 3D volume data is used to guide robotic dental surgery with intra-surgical images.

In some embodiments, OCT data or 3D volume data is used to predict and/or localize anatomical or pathological conditions. In some embodiments, anatomical or pathological conditions are located on contacts between teeth, sub gingival tooth surfaces, and can manifest as caries, cracks, root canals, or fractures. In some embodiments, the OCT or 3D volume data is used to localize bone, root placement positions, or edentulous areas, or ideal dental implant placement areas.

In some embodiments the OCT or 3D volume data is used to create a treatment plan. In some embodiments the treatment plan is approved by a clinician or user. In some embodiments a robotic system is used to execute the treatment plan. In some embodiments the OCT data or 3D volume data is used to guide a robotic execution of a dental procedure. In some embodiments the procedure is a dental filling, a dental crown, a root canal, a dental implant. In some embodiments, the robotic control is fully or partially automated. In some embodiments, the dentist guides a robotic arm.

In some embodiments, one or a combination of the OCT Data or 3D volume data, 3D scan data, and/or tooth surface data are used to determine a pathology volume. In some embodiments, a pathology volume constitutes a precisely localized volume of caries, a tooth fracture, tooth resorption. In some embodiments, a pathology constitutes soft tissue pathology including gingivitis or periodontitis. In some embodiments, pathology includes bone pathology including bone cysts. In some embodiments, one or a combination of the OCT Data or 3D volume data, 3D scan data, pathology volume, and/or tooth surface geometry/topology are used to make a preparation geometry. In some embodiments, one or a combination of the OCT Data, or 3D volume data, 3D scan data, or tooth surface geometry/topology, pathology volume, and/or preparation geometry are used to make a restoration geometry. In some embodiments, one or a combination of the OCT Data, or 3D volume data, 3D scan data, tooth surface geometry/topology, preparation geometry, pathology volume, and/or restoration geometry are used to make a tool path trajectory to cut the tooth, or remove pathological tissue, or in some embodiments to fabricate a dental restoration or fixture. The tool path can be used to fabricate a restoration fixture either before or after the tooth/teeth have been cut.

In some embodiments, a fixture based on a 3D model of a completed preparation on a tooth is made. This method of producing a dental fixture comprises creating a three dimensional image of at least a portion of a dental item (e.g., a tooth): generating a 3D model of a completed dental preparation (e.g., a crown preparation) performed on that dental item; sending data associated with that three-dimensional model to a dental prosthetic production device; and producing a dental prosthetic in response to receipt of the data associated with the 3D model of a completed dental preparation. In some embodiments, the prosthetic is a dental crown. In some embodiments, the prosthetic is an implant. In some embodiments, the prosthetic is a dental implant abutment.

B. Use in Conjunction with an Automated Dental Treatment System

In some embodiments, a three-dimensional (3D) model or representation generated by the systems and methods herein is utilized to construct a cutting path or plan a procedure using an automated dental treatment system.

Figure 5:
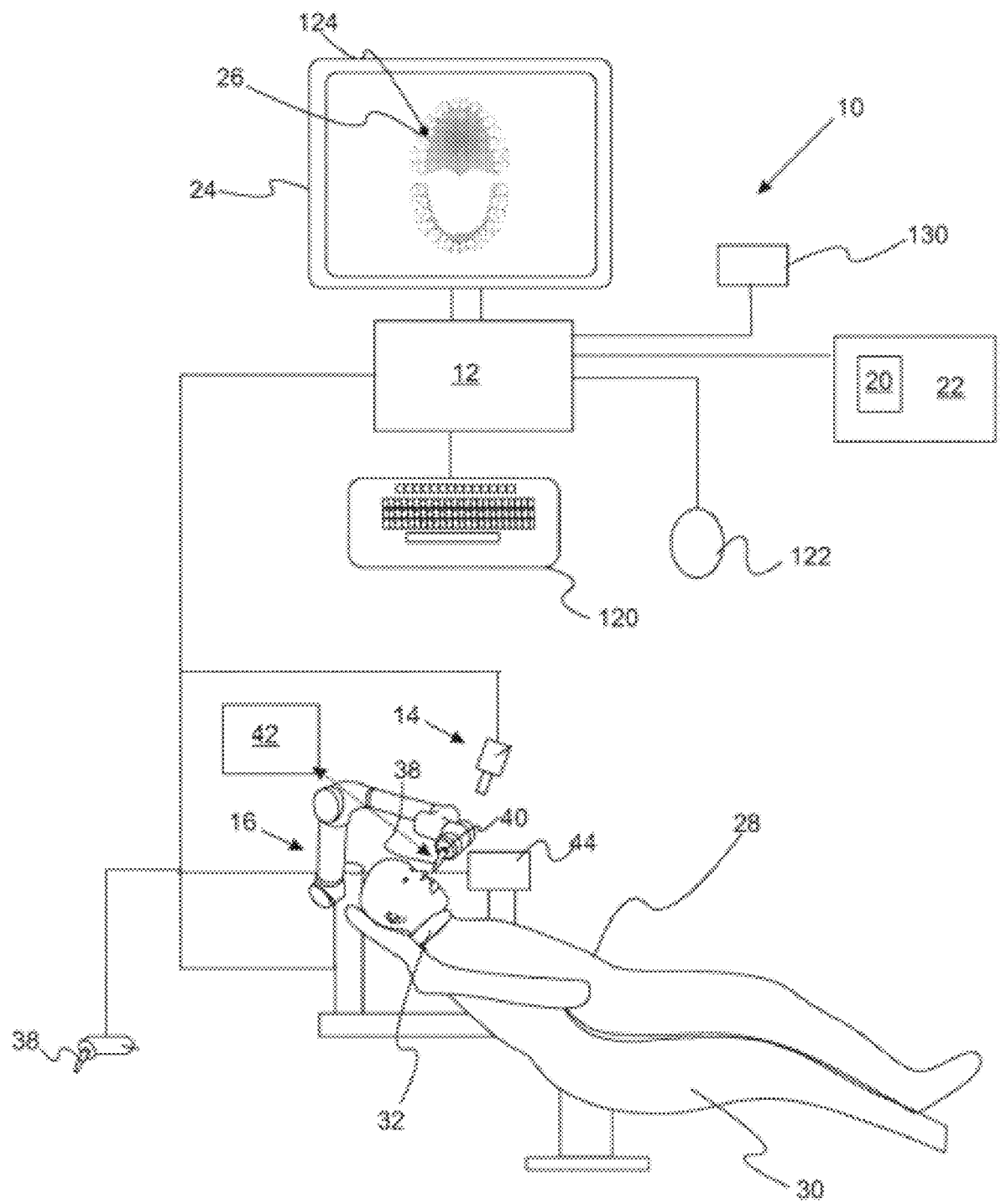
FIG. 5 shows an automated dental treatment system used in conjunction with an intra-oral dental tomography imaging system, according to some embodiments.

With reference to FIG. 5, a schematic illustration of an automated dental treatment system is depicted, according to some embodiments. In some embodiments, dental treatment system 10 includes central processing unit 12 in communication with tooth scanner 14 and robotic arm 16. In some embodiments the robotic arm 16 comprises at least six degrees-of-freedom. In some embodiments, a central processing unit 12 controls automated operation of the dental treatment system 10. In some embodiments, the central processing unit 12 receives image files, panned cut paths, or automated movement instructions. Positioning of automated movement instructions and cut path relative to the 3D representations generated by OCT systems and methods, as disclosed herein.

In some embodiments, the central processing unit 12 includes a display 24 on which the surgical process is guided through a series of onscreen prompts. Display 24 may render an image 26 of a target tooth requiring surgical intervention in subject 28 from an image file requiring surgical intervention. In some embodiments, projected cutting paths including visual indications 124 on the image of a target tooth to be treated.

In some embodiments, central processing unit 12 controls the robotic arm 16 to remove a region of the target tooth. Dental treatment system 10 may include input devices 120, 122 which can for example be a keyboard and mouse that receive surgical instructions from a user for providing the surgical intervention. In some embodiments, the instructions are received by the central processing unit 12. In some embodiments, the surgical instructions include visual indications 124 on the image of a target tooth that are to be treated. Control program 20 may guide the user through the dental protocols through a series of onscreen prompts (i.e., the user interface). In some embodiments, actions attributable to control program 20 is understood to mean the execution of the relevant steps by central processing unit 12. In some embodiments, dental treatment system 10 includes static memory 130 for storing patient profiles and records which can be accessed by the user. In a refinement, central processing unit 12 also displays a load screen that shows a series of patient records and gives the option to load an existing patient, or create a new patient record.

FIG. 5 depicts subject 28 sitting in dental chair 30. The subject's head may be immobilized by head restraint 32. Robot arm 16 may include an end effector 38 for performing dental surgery. End effector 38 may be a numerically controlled dental drill. In some embodiments, coupler 40 is used to attach a conventional high speed electric dental hand piece to the robotic arm 16. In some embodiments, tool changer 42 allows automatic tool change of burs for robotic arm. In some embodiments, dental treatment system 10 includes passive positioning encoder arm 44 which tracks the patient position and relays it to central processing unit 12.

In some embodiments, robotic arm 16 consists of a multi jointed arm to allow precise movement of end effector 44. In some embodiments, a passive positioning encoder arm 44 tracks the subject's head motion and tooth motion. In some embodiments, encoder arm 44 consists of a multi-jointed arm with encoders to generate a 3D position of its end effector. In some embodiments, the encoder is rooted at a specific point relative to the robotic arm. In some embodiments, the encoder is clamped to a tooth posterior to the target tooth being worked on surgically. In some embodiments, the encoder is clamped to a tooth proximal to the target tooth.

In some embodiments, passive positioning encoder arm 44 also includes sensor output cable which is used to transfer positioning information to central processing unit 12. In some embodiments, the encoder arm includes encoders that generate a 3D position of the end effector (i.e., a modified rubber dam clamp). In some embodiments, the encoder arm 44 is passive with respect to reciprocal forces generated on the modified rubber dam clamp as the subject moves and that movement is met with no resistance by the passive arm. For example, the subject moves and a force is applied to the rubber dam clamp, that force is then transferred to the positioning arm, and any resistance to its movement would generate a reciprocal force to the rubber dam clamp. In some embodiments, encoder arm 44 senses fast movements by the subject that trigger a shutdown procedure. In another variation, encoder arm 44 is operable to being shut down by the subject (i.e., by a switch).

Exemplary automated dental treatment systems which may be used in conjunction with the OCT systems and methods herein include the automated dental treatment system described in published application WO 2017/130060 A1 and the automated dental drill system described in published application WO 2019/215512 A1, which are incorporated by reference herein.

VIII. Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a", "an" and "the" include plural references unless the context clearly dictates otherwise. For example, the term "a sample" includes a plurality of samples, including mixtures thereof.

The terms "determining," "measuring," "evaluating," "assessing," "assaying," and "analyzing" are often used interchangeably herein to refer to forms of measurement. The terms include determining if an element is present or not (for example, detection). These terms can include quantitative, qualitative, or quantitative and qualitative determinations. Assessing can be relative or absolute. "Detecting the presence of" can include determining the amount of something present in addition to determining whether it is present or absent depending on the context.

The terms "subject," "individual," or "patient" are often used interchangeably herein. A "subject" can be a biological entity containing expressed genetic materials. The biological entity can be a plant, animal, or microorganism, including, for example, bacteria, viruses, fungi, and protozoa. The subject can be tissues, cells and their progeny of a biological entity obtained in vivo or cultured in vitro. The subject can be a mammal. The mammal can be a human. The subject may be diagnosed or suspected of being at high risk for a disease. In some cases, the subject is not necessarily diagnosed or suspected of being at high risk for the disease.

The term "in vivo" is used to describe an event that takes place in a subject's body.

The term "ex vivo" is used to describe an event that takes place outside of a subject's body. An ex vivo assay is not performed on a subject. Rather, it is performed upon a sample separate from a subject. An example of an ex vivo assay performed on a sample is an "in vitro" assay.

The term "in vitro" is used to describe an event that takes places contained in a container for holding laboratory reagent such that it is separated from the biological source from which the material is obtained. In vitro assays can encompass cell-based assays in which living or dead cells are employed. In vitro assays can also encompass a cell-free assay in which no intact cells are employed.

As used herein, the term "about" a number refers to that number plus or minus 10% of that number. The term "about" a range refers to that range minus 10% of its lowest value and plus 10% of its greatest value.

As used herein, the terms "treatment" or "treating" are used in reference to a pharmaceutical or other intervention regimen for obtaining beneficial or desired results in the recipient. Beneficial or desired results include but are not limited to a therapeutic benefit and/or a prophylactic benefit. A therapeutic benefit may refer to eradication or amelioration of symptoms or of an underlying disorder being treated. Also, a therapeutic benefit can be achieved with the eradication or amelioration of one or more of the physiological symptoms associated with the underlying disorder such that an improvement is observed in the subject, notwithstanding that the subject may still be afflicted with the underlying disorder. A prophylactic effect includes delaying, preventing, or eliminating the appearance of a disease or condition, delaying, or eliminating the onset of symptoms of a disease or condition, slowing, halting, or reversing the progression of a disease or condition, or any combination thereof. For prophylactic benefit, a subject at risk of developing a particular disease, or to a subject reporting one or more of the physiological symptoms of a disease may undergo treatment, even though a diagnosis of this disease may not have been made.

The section headings used herein are for organizational purposes only and are not to be construed as limiting the subject matter described.

IX. Examples

The following examples are included for illustrative purposes only and are not intended to limit the scope of the invention.

Example 1: OCT or 3 Volume Data Image Registration Method Using Robotic Positional Data and Surface Extraction from Collected Data In some embodiments, the method comprises identifying the coordinates of the base of the robotic arm that holds the OCT scanner probe P0 and two orientation vectors U0 and V0 which combined with P0 define the coordinate system CS0 at the base of the robot. In some embodiments, a second coordinate system is established on the OCT scanner probe with position P1 and orientation vectors U1 and V1, defining the coordinate system CS1. In some embodiments, the position of the scanner probe with respect to the robot arm requires calibration which can be done at initial assembly or from time-to-time thereafter.

If the robotic arm and OCT or image scanner probe is fixed, then only one coordinate system needs to be identified.

In some embodiments, a transformation matrix M1 is determined which maps points from CS1 to CS0. A first OCT scan of a portion of the dental anatomy is then performed. The spatial location and orientation of the captured image volume is known from the design parameters of the OCT scanner and the known CS1. The spatial location and orientation of the image volume is represented by a 3D coordinate system. The M1 matrix is applied to transform the coordinate system of the image volume into the robot coordinate system. In some embodiments, segmentation algorithms are used to extract surface positions of a plurality of features of the captured dental anatomy, such as the exterior boundary of a portion of a tooth. The surface positions (x1, y1, z1) extracted from the OCT are then transformed into the robot base coordinate system CS0 using M1.

A second OCT or 3D volume image scan of the object is performed by moving the OCT scanner probe using the robotic arm to P2 with orientation vectors U2 and V2 defining coordinate system CS2. A transformation matrix, M2, is determined which maps points from CS2 to CS0. The movement from the first position and orientation to the second position and orientation may be done automatically by the robot. Automatic movement may be controlled by a controlling device. The spatial location and orientation of the second image volume is then transformed into the robot base coordinate system CS0 using M2.

In some embodiments, segmentation algorithms are used to extract surface positions of a plurality of features of the captured dental anatomy, such as the exterior boundary of a portion of a tooth. The surface positions (x2, y2, z2) extracted from the OCT are then transformed into the robot base coordinate system CS0 using M2. The image volumes from the first and second images are then stitched together forming a larger composite image. The above methodology is repeated to obtain an extended volumetric image of a partial tooth or a plurality of whole and partial teeth. In some embodiments, the stitching algorithm combines the first and second images by overlaying them in the common coordinate system CS0 and merging overlapping data by means of averaging the samples representing overlapping portions of the dental anatomy. In some embodiments, the extracted surface data is used to improve the registration of the two image volumes using an algorithm such as ICP to minimize the distance between 3D point sample data on the two extracted surfaces before combining volumetric image sample data.

In some embodiments, the above methodology is repeated to obtain whole arch volumetric images representing: surface topology, 3D OCT, or 3D volume information beneath the surface. In some embodiments, the above methodology is repeated to obtain buccal bite registration images representing: surface topology, 3D OCT, or 3D volume image information beneath the surface.

In some embodiments, the identification of surface position coordinates (x, y, z) from the OCT or 3D volume probe to the surface of the object uses the presence of an air gap (or "working distance") between the OCT scanner probe and the target tooth. The air gap is used to identify the exterior surface of a tooth (or portion thereof). The identification may be facilitated since the closest large amplitude peak in the OCT A-scans relative to the position of the OCT scan probe can be identified as the surface position.

In some embodiments, segmentation is used to identify the surfaces of a tooth, including the portions at the proximal region and within gingival tissue (margins), other dental tooth anatomy (cracks, canals etc.) and caries and other tooth pathologies. In some embodiments, the segmentation and identification are achieved by machine/deep learning. In some embodiments, the method assumes the coordinate system for the robot is absolute.

Example 2: Exemplary OCT System Coupled to a Computing Device

With reference to FIG. 3, an exemplary system for acquiring representation of a dental anatomy 301 comprises an OCT imaging device 307 with an intra-oral probe 302, according to some embodiments. In some embodiments, the system comprises an articulating arm 305. In some embodiments, a rigid coupling 303 connects the articulating arm 305 to the probe 302. In some embodiments, the articulating arm is provided with position and orientation sensors 306. In some embodiments, the articulating arm is provided with an end effector 304, as disclosed herein.

In some embodiments, the system comprises a computing device 308. In some embodiments, the computing device is operatively coupled to the position and orientation sensors 306 of the articulating arm 305. In some embodiments, the computing device 308 is operatively coupled to receive images from the OCT imaging system 307. In some embodiments the computing device comprises a processor and a non-transitory computer readable storage medium with a computer program. In some embodiments, the computing program includes instructions executable by the processor causing the processor to calculate 3D coordinate system transformations for mapping individual OCT image volumes into a single combined representation of a dental anatomy, as disclosed herein. In some embodiments, the computer program utilizes positional date received from the position and orientation sensors to assign positional/orientation data to the individual OCT image volumes. In other words, in some embodiments, the computing device 308 forms an extended OCT volume be registering multiple OCT frames using the position/orientation data.

As disclosed herein, positional and orientational data may be generated based off a position of a support fixture or clamp coupled to a portion of the dental anatomy. In some embodiments, the OCT system may register a portion of the OCT probe based off a portion of the support fixture captured within a portion of the OCT frame.

Example 3: EXEMPLARY OCT POSITIONING SYSTEM

Figure 4:
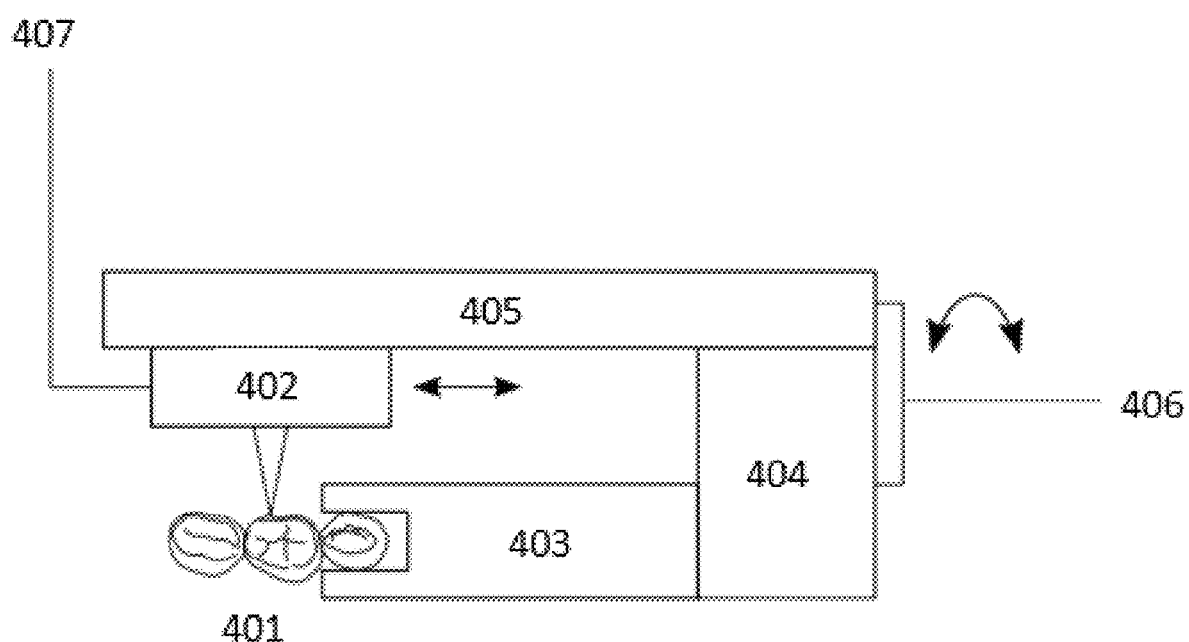
FIG. 4 shows an exemplary block diagram system for intra-oral dental tomography imaging system, according to some embodiments.

With reference to FIG. 4, a system for positioning and orienting an OCT/intra-oral probe 402 is depicted, according to some embodiments. In some embodiments, the OCT probe captures a series of image volumes or frames including a target dental anatomy. In some embodiments, the probe is in communication with an OCT imaging system 407.

In some embodiments, the positioning system comprises a rigid coupling 403, as discussed herein. In some embodiments, the rigid coupling 403 is a tooth clamp, as discussed herein. In some embodiments, the rigid coupling connects to the OCT probe 402 and allows translation and rotation of the OCT probe about the target dental anatomy 401.

In some embodiments, the system comprises a rotational stage 404 connecting the probe 402 to the coupling 403 to allow rotation of probe 402 relative to the dental anatomy 401. In some embodiments, the system comprises a rail system 405 connecting the probe 402 to the coupling 403 to allow translation of probe 402 relative to the dental anatomy 401. In some embodiments, the combination of a rotational stage 404 and translational rail system 405 allow multiple points of positioning for the probe 402 relative to the target dental anatomy 401.

In some embodiments, a disclosed above, the positioning system comprises one or more position and orientation sensors 406. In some embodiments, the position and orientation sensors generate positional and orientational data based on translation and rotation of the probe 402 about the dental anatomy. As disclosed herein, the position and orientation data may be utilized to facilitate generation of a three-dimensional representation of the dental anatomy 401 by stitching multiple OCT image frames together based on the position and orientation data provided by the sensors 406. In some embodiments, the system is in communication with a computing device which processes the OCT images to stitch them together and form a three-dimensional representation of the entire target dental anatomy. In some embodiments, the computing device comprises a processor including instructions for stitching two or more OCT images together based on the positional and/or orientational data provided by the sensors 406.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A robotic dental surgical system comprising:
an optical coherence tomography (OCT) imaging device configured to capture an OCT image of a dental anatomy;
a supporting fixture rigidly connected to a portion of the dental anatomy;
an end effector attached to a robotic arm to operate on the dental anatomy, wherein a robotic base of the robotic arm is rigidly coupled to the supporting fixture thereby registering the robotic base to the dental anatomy;
a processor and a non-transitory computer readable storage medium with a computer program including instructions executable by the processor causing the processor to process the OCT image containing at least a portion of the supporting fixture to register a coordinate system of the OCT imaging device to the robotic arm and generate an instruction to control an operation of the end effector based at least in part on the OCT image.

2. The robotic dental surgical system of claim 1, further comprising a mechanical stabilization system to stabilize the OCT image captured by the OCT imaging device.

3. The robotic dental surgical system of claim 2, wherein the stabilization is achieved via electromechanical actuators.

4. The robotic dental surgical system of claim 2, wherein the stabilization is achieved via feedback control or feedforward control.

5. The robotic dental surgical system of claim 1, further comprising an optical stabilization mechanism leveraging scanning laser confocal microscopic images to stabilize the OCT image captured by the OCT imaging device.

6. The robotic dental surgical system of claim 1, wherein the supporting fixture is a clamp rigidly coupled to one or more teeth.

7. The robotic dental surgical system of claim 1, further comprising a color image sensor configured to capture a color image of the dental anatomy.

8. The robotic dental surgical system of claim 7, wherein the color image is superimposed onto a surface boundary extracted from the OCT image.

9. The robotic dental surgical system of claim 1, wherein the OCT imaging device is rigidly coupled to the supporting fixture.

10. The robotic dental surgical system of claim 1, wherein the end effector is a dental drill and wherein the instruction to control the operation of the end effector comprises a cut path of the dental drill.

11. A method for robotic dental surgical operations comprising:
rigidly connecting a supporting fixture to a portion of a dental anatomy;
capturing an optical coherence tomography (OCT) image of the dental anatomy with aid of an imaging device;
performing a robotic operation on the dental anatomy via an end effector, wherein the end effector is attached to a robotic arm and wherein a robotic base of the robotic arm is rigidly coupled to the supporting fixture thereby registering the robotic base to the dental anatomy;
processing the OCT image containing at least a portion of the supporting fixture to register a coordinate system of the OCT imaging device to the robotic arm; and
generating an instruction to control the robotic operation of the end effector based at least in part on the OCT image.

12. The method of claim 11, further comprising providing a mechanical stabilization system to stabilize the OCT image captured by the OCT imaging device.

13. The method of claim 12, wherein the stabilization is achieved via electromechanical actuators.

14. The method of claim 13, wherein the stabilization is achieved via feedback control or feedforward control.

15. The method of claim 11, further comprising providing an optical stabilization mechanism leveraging scanning laser confocal microscopic images to stabilize the OCT image captured by the OCT imaging device.

16. The method of claim 11, wherein the supporting fixture is a clamp rigidly coupled to one or more teeth.

17. The method of claim 11, further comprising capturing a color image of the dental anatomy with aid of a color image sensor.

18. The method of claim 17, further comprising superimposing the color image onto a surface boundary extracted from the OCT image.

19. The method of claim 11, wherein the OCT imaging device is rigidly coupled to the supporting fixture.

20. The method of claim 11, wherein the end effector is a dental drill and wherein the instruction to control the operation of the end effector comprises a cut path of the dental drill.

* * * * *